United States Patent Office 3,004,047
Patented Oct. 10, 1961

3,004,047
6α-HALO-11α-HYDROXY STEROIDS OF THE PREGNANE SERIES AND ESTERS THEREOF
Josef Fried, Princeton, and Pacifico A. Principe, New Brunswick, N.J., assignors to Olin Mathieson Chemical Corporation, New York, N.Y., a corporation of Virginia
No Drawing. Filed Mar. 13, 1959, Ser. No. 799,093
9 Claims. (Cl. 260—397.45)

This invention relates to the synthesis of valuable steroids and more particularly has for its its objects the provision of an improved method for preparing 6α-halo-9 (11)-dehydrosteroids, and new intermediates utilizable in said preparation.

The final products preparable by the process of this invention can be represented by the general formula

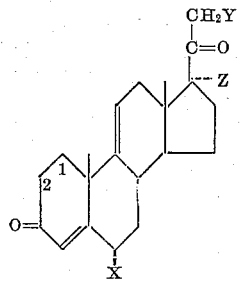

wherein the 1,2-position is saturated or double-bonded, X is halogen (preferably fluoro or chloro), Z is hydrogen or hydroxy, and Y is hydrogen, hydroxy or acyloxy (especially the acyloxy radical of a hydrocarbon carboxylic acid of less than ten carbon atoms).

To prepare these final products, which are themselves useful intermediates in the preparation of the physiologically active corresponding 6α,9α-dihalo-11β-hydroxy steroid derivatives, a steroid of the general formula

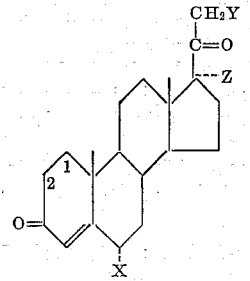

wherein the 1,2-position is saturated or double-bonded and X, Y and Z are as hereinbefore defined, is subjected to the action of enzymes of an 11α-hydroxylating microorganism, thereby yielding the new intermediates of this invention of the general formula

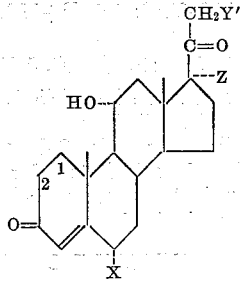

wherein the 1,2-position is saturated or double-bonded, X and Z are as hereinbefore defined, and Y' is hydrogen or hydroxy.

This conversion is accomplished by bringing together the starting steroid and the enzymes of the microorganism in an aqueous medium containing a source of nitrogenous factors and an assimilable source of carbon and energy, in the presence of oxygen, and recovering the 11α-hydroxy steroid formed. Among the suitable microorganisms may be mentioned *Aspergillus nidulans*, *Aspergillus niger*, *Aspergillus ochraceus*, *Aspergillus gigantius*, *Aspergillus amsterlodami* and other Aspergillus species, *Rhizopus nigricans*, *Rhizopus arrhizus* and other Rhizopus species, *Neurospora sitophila* and other Neurospora species, *Pestalotia foedans* and other Pestalotia species, *Dactylicum dendroides* and other Dactylicum species, *Cephalothecium roseum* and other Cephalothecium species, *Absidia glauca* and other Absidia species, *Delacroixia caronata* and other Delacroixia species, *Tricothecium roseum* and other Tricothecium species, *Thamnidium elegans* and other Thamnidium species, *Syncephalostrum racemonsum* and other Syncephalostrum species, and certain Penicillium species.

In general, the conditions of culturing the microorganisms for the purposes of this invention are (except for the inclusion of the steroid to be converted) the same as those of culturing microorganisms for the production of organic acids, antibiotics, etc., i.e., the microorganism is aerobically grown in contact with (in or on) a suitable fermentation medium. A suitable medium essentially comprises a source of nitrogenous factors and a source of carbon and energy. The latter may be carbohydrate (such as sucrose, molasses, glucose, maltose, starch or dextrin), a higher fatty acid, a fat and/or the steroid itself. Preferably, however, the medium includes an assimilable source of carbon and energy in addition to the steroid. The sources of nitrogenous factors may be organic (e.g., soybean meal, corn steep liquor, meat extract and/or distillers solubles) or synthetic (e.g., composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The steroid may be added to the culture during the incubation period or included in the medium prior to sterilization or inoculation.

Suitable starting steroids include the 6α-haloprogesterones (e.g. 6α-fluoroprogesterone and 6α-chloroprogesterone), the 6α-halo-1-dehydroprogesterones (e.g. 6α-fluoro-1-dehydroprogesterone), the 6α-halo-17-α-hydroxyprogesterones (e.g. 6α-fluoro-17α-hydroxyprogesterone), the 6α-halo-17α-hydroxy-1-dehydroprogesterones, the 6α-halo - 11 - desoxycorticosterones (e.g. 6α - fluoro - 11-desoxycorticosterone and 6α-chloro-11-desoxycorticosterone), the 6α-halo-11-desoxy-1-dehydrocorticosterones, the 6α-halo-17α,21-dihydroxyprogesterones (e.g. 6α-fluoro-Compound S and 6α-chloro-Compound S), and the 6α - halo - Δ$^{1,4}$ - pregnadiene - 17α,21 - diol - 3,20-diones (e.g. 6α - fluoro - Δ$^{1,4}$ - pregnadiene - 17α,21 - diol - 3,20 - dione and 6α - chloro - Δ$^{1,4}$ - pregnadiene-17α,21-diol-3,20-dione). In addition 21-esters of those steroids containing a 21-hydroxy group may be employed; however, since the 21-ester is hydrolyzed during the microbial conversion these esters are in effect equivalent to the free 21-hydroxyl compounds. In those cases where the 1-dehydro starting steroids are new compounds, they can be prepared from the corresponding 1,2-saturated derivatives by microbial dehydrogenation, using for example *Bacterium cyclo-oxydans* and the procedure disclosed in U.S. Patent No. 2,822,318.

If the 11α-hydroxy steroids formed contain a 21-hydroxyl group (Y is hydroxy), the compound is then esterified in the 21-position to protect this group. This esterification is accomplished in the usual manner by treating the steroid with one mole equivalent of an acylating agent such as an acyl halide or acid anhydride in the presence of a basic agent. Suitable acylating agents include the acyl chlorides and acid anhydrides of hydrocarbon carboxylic acids of less than ten carbon atoms, as exemplified by the lower alkanoic acids (e.g. acetic, propionic and hexanoic acid), aromatic carboxylic acids (e.g. benzoic and toluic acid), aralkanoic acids (e.g. phenacetic and β-phenylpropionic acid), cycloalkanecarboxylic acids, cycloalkenecarboxylic acids, and lower alkenoic acids.

The steroids thus formed having the general formula

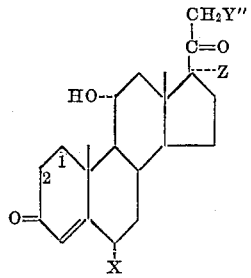

wherein the 1,2-position is saturated or double-bonded, X and Z are as hereinbefore defined, and Y″ is hydrogen or acyloxy, are then converted to an 11α-sulfonate by treatment with a sulfonating agent such as an organic sulfonyl halide, the reaction preferably being conducted in the presence of a tertiary base, such as pyridine. Particularly preferred among the sulfonating agents are the lower alkane sulfonyl chlorides as exemplified by methanesulfonyl chloride and ethanesulfonyl chloride. The reaction results in the preparation of the new 11α-sulfonic acid esters of this invention having the general formula

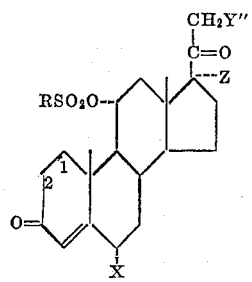

wherein the 1,2-position is saturated or double-bonded, X, Y″ and Z are as hereinbefore defined and R is an organic radical, preferably a lower alkyl.

These sulfonic acid ester derivatives are then desulfonated to yield the final 9(11)-dehydro steroid derivatives. Among the suitable reactants utilizable in this step of the process of this invention may be mentioned the alkali metal salts of lower fatty acids (e.g. sodium acetate) in a medium consisting of the corresponding fatty acid (e.g. acetic acid).

The following examples illustrate the invention (all temperatures being in centigrade):

EXAMPLE 1

6α-fluoro-11-epihydrocortisone[6α-fluoro-Δ⁴-pregnene-11α,17α,21-triol-3,20-dione]

(a) *Fermentation.*—A medium of the following composition is prepared:

|  | G. |
|---|---|
| Corn steep liquor | 36 |
| Brown sugar | 10 |
| NaNO$_3$ | 6 |
| CaCO$_3$ | 5 |
| Lard oil | 2 |
| KH$_2$PO$_4$ | 1.5 |
| MgSO$_4$·7H$_2$O | 0.5 |
| ZnSO$_4$ (1% solution) | 0.1 |

Distilled water to make one liter.
Steam-sterilized for 30 minutes at 15 p.s.i.

The pH of the medium is adjusted to 7.0±0.1 (with sodium hydroxide solution); and 50 ml. portions of the medium are distributed in 250 ml. Erlenmeyer flasks and the flasks plugged with cotton and sterilized by autoclaving for 30 minutes at 120°. When cool, each of the flasks is inoculated with one ml. portions of a vegetative inoculum of *Aspergillus nidulans* (ATCC 11267), prepared as described hereinafter. The flasks are mechanically shaken for 22 hours on a rotary shaker (280 cycles/min.—2 inch radius) in a room maintained at 25°, after which time 10% transfers (by volume) are made to 250 ml. Erlenmeyer flasks (sterilized as described above), each containing 50 ml. of the following medium:

|  | G. |
|---|---|
| Cornsteep liquor | 6 |
| NH$_4$H$_2$PO$_4$ | 3 |
| CaCO$_3$ | 2.5 |
| Soybean oil | 2.2 |

Distilled water to make one liter.
Sterilized and neutralized as above.

Prior to inoculation, to each of the second series of flasks is added 0.25 ml. of a 60 mg./ml. solution of 6α-fluoro-Compound S (6α-fluoro - Δ⁴ - pregnene-17α,21-diol-3,20-dione) in N,N-dimethylformamide. These flasks are then incubated under the same conditions as used for the first series of flasks for 100 hours, after which the contents of the flasks are pooled and filtered by suction through Seitz clarifying pads. [The vegetative inoculum used is grown from stock cultures (lypohilized vial or agar slant) for three weeks in a medium of the following composition: glucose, 20 g.; yeast extract, 2.5 g.; K$_2$HPO$_4$, 1 g.; agar, 20 g.; and distilled water to make one liter. For inoculation the surface growth was suspended in 5 ml. of a 0.01% Dupanol solution.]

(b) *Isolation of 6α - fluoro - 11 - epihydrocortisone.*—4,940 ml. of the culture filtrate obtained in a (based on the fermentation of 1.41 g. of 6α-fluoro-Compound S) is extracted with four one liter portions of methylisobutyl ketone and the combined extracts evaporated to dryness in vacuo. The crude residue (about 970 mg.) is dissolved in a small amount of chloroform and after cooling the crystals are separated by filtration. Stepwise concentration of the chloroform mother liquors yield 3 successive crops of crystals, all of which are recrystallized from acetone-hexane to yield a total of about 520 mg. of crude 6α-fluoro-11-epihydrocortisone. This on recrystallization from acetone-hexane yields about 470 mg. of the pure compound having the following properties: M.P. about 201–203, $[\alpha]_D^{23}$+100° (c, 0.46 in 95% ethanol);

$\lambda_{max.}^{alc.}$ 236 mμ (ε=14,000); $\lambda_{max.}^{Nujol}$ 2.88, 2.97, 5.86, 6.04, 6.20μ

*Analysis.*—Calcd. for C$_{21}$H$_{29}$O$_5$F(380.44): C, 66.26; H, 7.67; F, 5.11. Found: C, 66.37; H, 7.77; F, 4.78.

From the combined acetone-hexane mother liquors is obtained a second isomeric substance, 6α-fluoro-Δ⁴-pregnene-15β,17α,21-triol-3,20-dione of the following properties: M.P. about 225–228°; $[\alpha]_D^{23}$+79° (c, 0.34 in 95% ethanol);

$\lambda_{max.}^{alc.}$ 236 mμ (ε=15,900); $\lambda_{max.}^{Nujol}$ 2.97, 5.85, 6.05 and 6.18μ

*Analysis.*—Calcd. for C$_{21}$H$_{29}$O$_5$F(380.44); C, 66.26; H, 7.67. Found: C, 66.02; H, 7.66.

When *Aspergillus niger* (Wis 72–7) or *Rhizopus nigricans* (Rutgers–86) is substituted for the *Asperigillus nidulans* in Example 1, the same 6α-fluoro-11-epihydrocortisone product is obtained.

EXAMPLE 2

6α-chloro-11-epihydrocortisone

Following the procedure of Example 1, but substituting the same amount of 6α-chloro-Compond S for the 6α-fluoro-Compound S, 6α-chloro-11-epihydrocortisone is obtained.

EXAMPLE 3

6α-fluoro-11α,17α-dihydroxyprogresterone

Following the procedure of Example 1, but substituting an equivalent amount of 6α-fluoro-17α-hydroxy progesterone for the 6α-fluoro-Compound S, 6α-fluoro-11α,17α-dihydroxyprogesterone is obtained.

EXAMPLE 4

6α-fluoro-Δ$^{1,4}$-pregnadiene-11α,17α,21-triol-3,20-dione

Following the procedure of Example 1, but substituting the same amount of 6α-fluoro-Δ$^{1,4}$-pregnadiene-17α,21-diol-3,20-dione for the 6α-fluoro-Compound S, 6α-fluoro-Δ$^{1,4}$-pregnadiene-11α,17α,21-triol-3,20-dione is obtained.

Similarly, 6α-fluoroprogesterone, 6α-fluoro-Δ$^{1,4}$-pregnadiene-17α-ol-3,20-dione, 6α - fluoro - 11-desoxycorticosterone, 6α-fluoro-Δ$^{1,4}$-pregnadiene-3,20-dione, and 6α-fluoro-Δ$^{1,4}$-pregnadiene-21-ol-3,20-dione yield 6α-fluoro-11α-hydroxyprogesterone, 6α-fluoro - Δ$^{1,4}$ - pregnadiene-11α,17α-diol-3,20-dione, 6α-fluoro-11-epicorticosterone, 6α-fluoro-Δ$^{1,4}$-pregnadiene-11α-ol-3,20-dione, and 6α - fluoro - Δ$^{1,4}$-pregnadiene-11α,21-diol-3,20-dione, respectively.

EXAMPLE 5

6α-fluoro-11-epihydrocortisone 21-acetate

To a solution of 239 mg. of 6α-fluoro-11-epihydrocortisone in 1 ml. of dry pyridine is added 1.65 ml. of a solution of 216 mg. of acetic anhydride and 5 ml. of pyridine. The mixture is allowed to stand at room temperature for 3½ hours, after which the reagents are evaporated in vacuo. The residue is taken up in ethyl acetate and the resulting solution evaporated again in vacuo in order to remove traces of acetic acid and pyridine. The resulting residue of 6α-fluoro-11-epihydrocortisone 21-acetate is used without further purification in the mesylation reaction of Example 7.

Similarly, if another acylating agent is used instead of acetic anhydride, the corresponding 21-ester if formed. Thus, propionic anhydride yields the 21-propionate and benzoyl chloride gives the 21-benzoate.

EXAMPLE 6

6α-fluoro-Δ$^{1,4}$-pregnadiene-11α,17α,21-triol-3,20-dione 21-acetate

Following the procedure of Example 5, but substituting 238 mg. of 6α-fluoro-Δ$^{1,4}$-pregnadiene-11α,17α,21-triol-3,20-dione for the 6α-fluoro-11-epihydrocortisone, 6α-fluoro-Δ$^{1,4}$-pregnadiene-11α,17α,21-triol-3,20-dione 21-acetate is obtained.

Similarly, 6α-chloro-11-epihydrocortisone, 6α-fluoro-Δ$^{1,4}$-pregnadiene-11α,21-diol-3,20-dione, and 6α-fluoro-11-epicorticosterone can be converted to their respective 21-acetate derivatives.

EXAMPLE 7

6α-fluoro-11-epihydrocortisone 21-acetate 11-mesylate

To a solution of 270 mg. of the dried residue obtained in Example 5 in 3 ml. of dried pyridine is added at 0° .15 ml. of methanesulfonyl chloride. The reaction is allowed to proceed for 18 hours, after which time excess methanesulfonyl chloride is destroyed by the addition of a small piece of ice. Water is then added and the mixture extracted with chloroform. The chloroform extract is washed with dilute hydrochloric acid, dilute sodium bicarbonate and finally with water, dried over sodium sulfate and the solvent removed in vacuo. The mesylate acetate crystallizes readily from acetone-hexane, the pure substances having the following properties: M.P. about 140–142° (dec.); [α]$_D^{23}$+104 (c, .59 in chloroform);

$\lambda_{max}^{alc}$. 243 mμ (ε=14,900); $\lambda_{max}^{Nujol}$ 2.87, 3.00, 5.72, 5.79, 5.94, 6.18, 7.53 and 8.6μ

Analysis.—Calc. for C$_{22}$H$_{33}$O$_8$SF·H$_2$O: C, 55.64; H, 6.80. Found: C, 56.01; H, 7.00.

If 0.15 ml. of methanesulfonyl chloride is substituted for the methanesulfonyl chloride in Example 7, the corresponding 11-ethanesfulonate is obtained.

EXAMPLE 8

6α-fluoro-Δ$^{1,4}$-pregnadiene-11α,17α,21-triol-3,20-dione-11α-mesylate 21-acetate Following the procedure of Example 7 but substituting 6α-fluoro-Δ$^{1,4}$-pregnadiene-11α,17α,21-triol-3,20-dione 21-acetate for the 6α-fluoro-11-epihydrocortisone 21-acetate, there is obtained 6α-fluoro-Δ$^{1,4}$-pregnadiene-11α,17α,21-triol-3,20-dione 11α-mesylate 21-acetate.

Similarly, 6α-chloro-11-epihydrocortisone 21-acetate, 6α-fluoro-Δ$^{1,4}$-pregnadiene-11α,21-diol-3,20-dione 21-acetate, 6α-fluoro-11-epicorticosterone 21-acetate, 6α-fluoro-11α-hydroxyprogesterone, 6α - fluoro - Δ$^{1,4}$ - pregnadiene-11α,17α-diol-3,20-dione, 6α-fluoro-11α,17α-dihydroxyprogesterone and 6α-fluoro-Δ$^{1,4}$-pregnadiene-11α-ol-3,20-dione yield their corresponding 11α-mesylate derivatives.

EXAMPLE 9

6α-fluoro-Δ$^{4,9(11)}$-pregnadiene-17α,21-diol-3,20-dione 21-acetate

A solution of 232 mg. of 6α-fluoro-11-epihydrocortisone 21-acetate 11-mesylate and 520 mg. of anhydrous sodium acetate in 5 ml. of glacial acetic acid is refluxed for ½ hour. The mixture is diluted with water, extracted with chloroform, and the chloroform extract washed with bicarbonate until neutral and finally with water. The extract is dried over sodium sulfate and the solvents removed in vacuo. The residual 9,11-dehydro compound after crystallization from acetone-hexane has the following properties: M.P. 220–221°; [α]$_D^{23}$+64° (c, .40 in acetone). Chromotography of the mother liquors on acid washed alumnia gives an additional amount of the above compound in elution with benzene. Elution with 10% of chloroform in benzene gives a small amount of the 11,21-diacetate of 6α-fluoro epi F of the following properties: M.P. about 215–217°; [α]$_D^{23}$+100° (c, 0.41 in CHCl$_3$);

$\lambda_{max}^{alc}$. 243 mμ (ε=16,900); $\lambda_{max}^{Nujol}$ 2.90, 5.77, 5.82, 5.96, 6.19μ

Analysis.—Calc. for C$_{20}$H$_{33}$O$_7$F(464.5): C, 64.65; H, 7.11. Found: C, 64.85; H, 7.17.

EXAMPLE 10

6α-fluoro-Δ$^{1,4,9(11)}$-pregnatriene-17α,21-diol-3,20-dione 21-acetate

Following the procedure of Example 9, but substituting 230 mg. of 6α-fluoro-Δ$^{1,4}$-pregnadiene-11α,17α,21-triol-epihdrocortisone 21 - acetate 11 - mesylate, 6α - fluoro-epihydrocortisone 21 - acetate 11 - mesylate, 6α - fluoro-Δ$^{1,4,9(11)}$-pregnatriene-17α,21-diol-3,20-dione 21-acetate is obtained.

Similarly, by following the procedure of Example 9, 6α-chloro - 11 - epihydrocortisone 11-mesylate 21-acetate, 6α - fluoro - Δ$^{1,4}$-pregnadiene-11α,21-diol-3,20-dione 11-mesylate 21-acetate, 6α-fluoro-11-epicorticosterone 11-mesylate 21-acetate, 6α-fluoro-11α-hydroxyprogesterone 11-mesylate, 6α-fluoro-Δ$^{1,4}$-pregnadiene-11α-ol-3,20-dione 11-mesylate, 6α-fluoro-11α,17α-dihydroxyprogesterone 11-mesylate, and 6α-fluoro - Δ$^{1,4}$ - pregnadiene-11α,17α-diol-3,20-dione 11-mesylate, yield 6α-chloro-Δ$^{4,9(11)}$-pregnadiene - 17α,21 - diol - 3,20 - dione 21-acetate, 6α-fluoro-Δ$^{1,4,9(11)}$-pregnatriene-21 - ol - 3,20 - dione 21-acetate, 6α-fluoro-Δ$^{4,9(11)}$-pregnadiene-21-ol-3,20-dione 21-acetate, 6α-fluoro-Δ$^{4,9(11)}$-pregnadiene-3,20-dione, 6α-fluoro-Δ$^{1,4,9(11)}$-pregnatriene - 3,20 - dione, 6α-fluoro-Δ$^{4,9(11)}$-pregnadiene-17α-ol-3,20-dione, and 6α - fluoro - Δ$^{1,4,9(11)}$-pregnatriene-17α-ol-3,20-dione, respectively.

The invention may be variously otherwise embodied within the scope of the appended claims.

What is claimed is:

1. A steroid of the formula

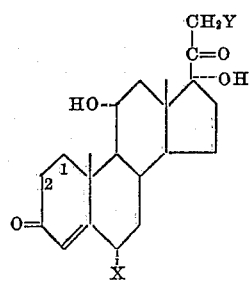

wherein the nuclear carbon atoms in the 1 and 2 positions are connected by a linkage selected from the group consisting of a single bond and a double-bond, X is a halogen selected from the group consisting of chloro and fluoro, and Y is selected from the group consisting of hydrogen, hydroxy and the acyloxy radical of a hydrocarbon carboxylic acid of less than ten carbon atoms.

2. 6α-fluoro-11-epihydrocortisone.
3. 6α-chloro-11-epihydrocortisone.
4. 6α - fluoro - $\Delta^{1,4}$-pregnadiene-11α,17α,21-triol-3,20-dione.
5. 6α-halo - 11 - epihydrocortisone 21-lower alkanoate, wherein the halo radical is selected from the group consisting of chloro and fluoro.
6. 6α-fluoro-11-epihydrocortisone 21-acetate.
7. A steroid of the formula

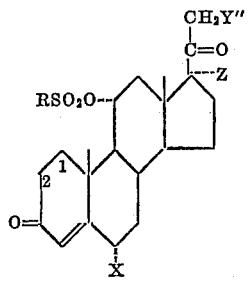

wherein the nuclear carbon atoms in the 1 and 2 positions are connected by a linkage selected from the group consisting of a single bond and a double-bond, X is a halogen selected from the group consisting of chloro and fluoro, Y" is selected from the group consisting of hydrogen and the acyloxy radical of a hydrocarbon carboxylic acid of less than ten carbon atoms, Z is selected from the group consisting of hydrogen and hydroxy, and R is lower alkyl.

8. 6α-halo - 11 - epihydrocortisone 21-lower alkanoate 11α-lower alkanesulfonate, wherein the halo radical is selected from the group consisting of chloro and fluoro.

9. 6α - fluoro - 11 - epihydrocortisone 21-acetate 11α-mesylate.

References Cited in the file of this patent

UNITED STATES PATENTS

| | | |
|---|---|---|
| 2,649,402 | Murray et al. | Aug. 18, 1953 |
| 2,819,264 | Gould et al. | Jan. 7, 1958 |
| 2,838,498 | Magerlein et al. | June 10, 1958 |
| 2,838,499 | Spero et al. | June 10, 1958 |
| 2,838,501 | Campbell et al. | June 10, 1958 |
| 2,852,511 | Fried | Sept. 16, 1958 |
| 2,880,205 | Campbell et al. | Mar. 31, 1959 |

OTHER REFERENCES

Ringold et al.: J. Am. Chem. Soc., vol. 80, No. 23, page 6464 (1958).